J. M. LEAVER, Jr.
INTERMITTENT AND OSCILLATORY ROTARY CUT-OFF SAW MACHINE.
APPLICATION FILED APR. 28, 1917.

1,359,394.

Patented Nov. 16, 1920.
8 SHEETS—SHEET 1.

Fig.1.

WITNESSES
Howard D. Orr.
F. T. Chapman

James M. Leaver, Jr., INVENTOR,

BY E. G. Siggers.

ATTORNEY

J. M. LEAVER, Jr.
INTERMITTENT AND OSCILLATORY ROTARY CUT-OFF SAW MACHINE.
APPLICATION FILED APR. 28, 1917.

1,359,394.

Patented Nov. 16, 1920.
8 SHEETS—SHEET 3.

WITNESSES
Howard D. Orr.
F. J. Chapman.

James M. Leaver, Jr., INVENTOR,

BY

ATTORNEY

J. M. LEAVER, Jr.
INTERMITTENT AND OSCILLATORY ROTARY CUT-OFF SAW MACHINE.
APPLICATION FILED APR. 28, 1917.

1,359,394.  
Patented Nov. 16, 1920.

UNITED STATES PATENT OFFICE.

JAMES MARSHALL LEAVER, JR., OF OAKLAND, CALIFORNIA.

INTERMITTENT AND OSCILLATORY ROTARY CUT-OFF SAW-MACHINE.

1,359,394.  Specification of Letters Patent.  Patented Nov. 16, 1920.

Application filed April 28, 1917. Serial No. 165,174.

*To all whom it may concern:*

Be it known that I, JAMES M. LEAVER, Jr., a citizen of the United States, residing at Oakland, in the county of Alameda and State of California, have invented a new and useful Intermittent and Oscillatory Rotary Cut-Off Saw-Machine, of which the following is a specification.

This invention has reference to intermittent and oscillatory rotary cut off saw machines, and its object is to provide a particularly simple and efficient rotary cut off saw machine capable of accurately severing lumber even of the most difficult kind with a minimum travel of the saw, the lumber remaining stationary during the cut off operation.

In accordance with the invention the saw, in its inactive position, is always below the top of the table receiving the work, and the saw is mounted upon an axis of rotation movable about another axis beneath the work-receiving table with the mounting rockable about the axis carrying it on a short radius, which radius may be considerably less than the radius of the saw. The arrangement is such that in the inactive position the teeth of the saw, which is a circular saw, are or may be close to that face of the work, considering the latter to be a board or the like, engaging the work-receiving table, and the axis of the saw is displaced from the axis of bodily movement of the saw in a plane which may be approximately parallel with that face of the work presented toward the saw. The bodily movement of the saw is through an arc-shaped path, first approaching the work in a direction substantially perpendicular to the face toward the saw, and the saw then constantly moves both through the work toward the opposite face thereof and along the work toward one edge thereof until the movement of the saw is crosswise of the work, whereby there is an ever changing and sweeping cut with the burden of the work on the front cutting edge of the saw so that the back cutting edge of the saw is relieved and smoother and finer work results than heretofore. Considering the work-receiving table as horizontal with the saw so mounted that at rest it is wholly beneath the top of the table, the bodily movement of the saw is first upwardly into the work through the bottom face thereof and then progressively upward and forward toward one edge of the work so that on wider pieces of work the saw may travel approximately parallel with the work leaving the work at the edge remote from that near where the saw entered the work.

The arrangement permits a saw of a certain diameter to cut off boards considerably wider than the diameter of the saw with the cut produced by the front cutting edge of the saw always greater than that produced by the rear cutting edge. As the front cutting edge of the saw is burdened with the desired direction cut, the back cutting edge is relieved and has a slower cutting feed and it is for this reason that smoother and finer work results.

Moreover, the short radius of swing of the saw permits building of the machine at a material saving in floor space without any reduction in the capacity of the machine for wide cutting. Furthermore, the short radius of bodily travel of the saw in a curved path permits the use of a relatively small diameter saw and avoids any material lost motion between the position of rest of the saw and its position of entrance into the work. The invention combines both a rising cut of the saw into the work and the sweep of the saw through the work crosswise of the latter, thus distinguishing from cut off machines which either cut through the work from face to face only, or cut through the work from edge to edge only.

The result is that the travel of the saw in traversing the work is reduced to a minimum and the machine as a whole is correspondingly simplified and the floor space occupied is also greatly reduced. Moreover, the direction and character of the cut is such that it is true and is not deflected by hard spots in the wood, such as are encountered in heart wood. Also the liability of pinching the saw, which occurs when the cut proceeds from one edge of the work toward the other, is avoided.

The saw may be belt driven, in which case the invention contemplates a belt directing structure associated with the saw, so as to maintain the belt in a taut condition in all positions of the saw in its travel, and at the same time provide a sufficient length of belt between the saw arbor and a drive shaft in the machine to insure a sufficient grip of the belt upon its drive pulley and the saw arbor pulley. Instead of depending upon belt drive, the short-radius swing of the saw arbor may be retained and gear drive be utilized. Such gear drive has the advantage of simplicity over the belt drive and freedom from liability of slipping and other disadvantages incident to belt drive.

The invention contemplates the employment of a simple and yet highly efficient means for causing the saw to travel through the work and return to normal position, so that the action is under the control of an operator providing ample opportunity for the proper placing of the work and accurate cutting thereof.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

Referring first to the structure illustrated in Figs. 1 to 7, inclusive, there is shown a frame 1 of web and flange construction, or any other suitable construction commonly employed in machines of the character of those to which the invention relates. The frame 1 is provided with a table 2 for the support of the work, indicated in some of the figures of the drawing at 3. There is also provided a straight edge or abutment 4 on the table 2, which straight edge may follow the usual custom as to construction and adjustments, and constitutes a work-locating means. There is further provided a saw guard 5 which may also follow the usual custom and needs no special description.

Mounted in the ends of the main frame 1 are brackets 6, in each of which there is located an anti-friction journal bearing 7, indicated as a ball bearing, but which may be of any suitable type. In each bearing 7 there is mounted one end of a pivot pin 8, the other end of which is made fast in a corresponding arm or leg $8^a$ of a yoke frame, of which the legs or arms are connected by a cross piece 9. One end of each leg or arm $8^a$ is shaped to constitute a counterweight 10, while the other end of the leg is bored out to receive an anti-friction journal bearing 11 similar to the bearing 7 and held in place by a cap plate 12 secured by screws 13 or otherwise to the arm $8^a$. Mounted in the bearings 11 of the two arms $8^a$ of the yoke frame is a saw arbor 14 carrying between the bearings a belt pulley 15 of ordinary construction. The arbor 14 has an extension 16 at one end extending beyond the corresponding end of the main frame, and there is provided with clamp blocks 17, 18, for holding a circular or rotary saw 19 on the arbor, the movable clamp block 18 being secured in place by a nut 20 screwed on to the arbor in the usual manner. The saw 19 is so located as to be close to one end of the table 2 and enter the guard 5 when the saw is at the lowermost limit of its travel, whereby an operator standing at the same side of the table is protected from accidental contact with the saw.

Carried by those ends of the arms $8^a$ in which the saw arbor is mounted are sleeves 21, each confining one end of a spacing bar 22 to the corresponding end of the yoke frame made up of the legs or arms 8ª and cross piece 9, said yoke frame forming a counterbalanced carrier for the saw arbor and circular saw thereon.

In order to accurately adjust and hold the saw with relation to the table and to compensate for inaccuracies in manufacture, each bracket 6 has a threaded opening 23 axially therethrough, and in each opening 23 there is a screw plug 24 with an expanded head 25 against which the journaled end of the respective pivot pins 8 abut. A non-circular socket 26 is formed in the outer end of each plug 24 for the application of a turning tool, so that the yoke frame carrying the saw may be accurately adjusted crosswise of the machine, that is, lengthwise of the pivotal axis of the yoke frame and securely locked in its adjusted position.

Secured to each arm 8ª in encircling relation to the respective pivot pin 8 is a sprocket wheel 27 engaged by a sprocket chain 28 continued to a low part of the frame of the machine, where it engages another sprocket wheel 29 on a shaft 30 journaled on the sides of the frame 1. Mounted on the shaft 30 is a pinion 31 in the path of a gear segment 32 fast on a rock shaft 33 under the control of a pedal lever 34 provided with a foot treadle 35 within easy reach of an operator. In the path of the yoke arms or legs 8ª or either of them, is a rest stop in the form of a block 36 held to the frame 1 by a set screw 37 which may extend through an elongated slot in the block 36 to permit adjustment of the latter, the purpose of the block being to limit the rocking of the saw-carrying yoke frame in a direction to lower the saw.

Near the lower portion of the main frame on the side of the latter remote from the operator's side there are secured brackets 38 in which is journaled a drive shaft 39 carrying a pulley 40. At one end of the machine the drive shaft 39 carries another pulley 41 by means of which the machine may be driven by a belt coming from some convenient source of power.

Each bracket 38 has a sleeve 42 projecting toward the other bracket, the sleeves being on opposite sides of the pulley 40, and these sleeves carry journal rings 43 on the ends of a swinging frame 44 consisting of two legs of web and flange construction connected intermediately by a cross piece 45, or the swinging frame may be of any other suitable construction answering the purposes of the invention. The frame rises from the sleeves 42 surrounding the shaft 39 toward, but terminates short of the table 2. Near the upper end, the frame 44 carries idler pulleys 46, 47, mounted on pins or shafts 48 carried by the frame 44. Near the upper end, the frame 44 is provided with ears 49 carrying pins 50 by means of which the ends of the spacing bars 22 remote from the saw arbor are pivotally connected to the frame in rear of the idler pulleys.

A belt 51 extends about the saw arbor pulley 15, around the idlers 46 and 47 and about the pulley 40, so that when power is applied to the pulley 41 it is transmitted through the shaft 39 to the pulley 40, and thence by way of the belt 51, about the idlers 46 and 47 to the arbor pulley 15. By properly proportioning the pulleys the desired speed of rotation is imparted to the saw.

The frame 44 is under the control of a spring 52 connected at one end to the frame 44 and at the other end to the main frame 1 at a convenient point. The tendency of the spring 52 is to move the frame 44 about its pivotal support on the shaft 39 toward the saw, and then the weight of the saw and parts carrying it is sufficient to overcome the counterweights 10, permitting the saw to drop to its normal or inactive position, with the edge of the saw just below the top of the table and a portion of the saw housed in the guard 5.

Assuming that the saw is rotating, the operator places a board 3 or other piece of work upon the table 2 with the latter entirely free from any moving parts projecting above its surface, so that the operator may adjust the work to the desired position without any liability whatever of injury.

With the work properly adjusted and either held by hand against the stop 4 and on the table 2, or by any suitable device, such as a saw guard shown and described in my copending application, No. 162,084, filed April 14, 1917, for a guard for cut off saws, the saw is started in the active direction by pressure applied to the treadle 35 of the lever 34 by the foot of the operator.

Figure 1:
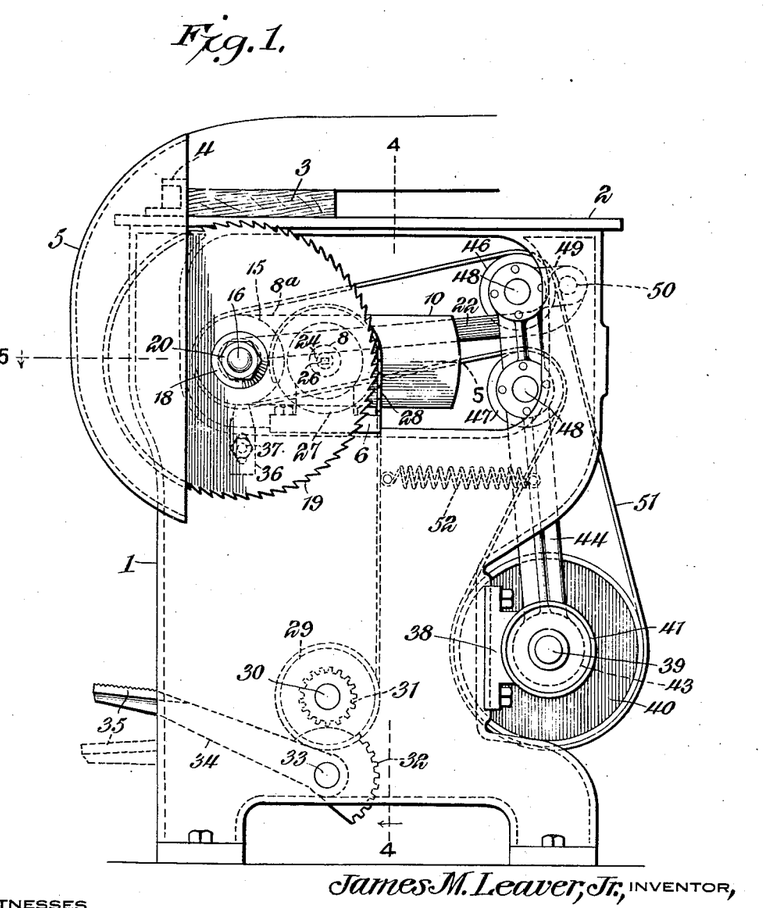
Figure 1 is an elevation of that end of a belt drive cut-off saw machine embodying the invention, the end seen in the drawing being that to the right of an operator using the machine.

When the saw guard of the said application is provided, the first part of the movement of the treadle causes the saw guard to be brought into clamping relation to the work, the treadle controlled parts being appropriately constructed for the purpose, but as these parts are not shown in the drawings it may be considered that the first movement of the foot lever or treadle imparts a movement of rotation to the sprocket wheels 29 or other like membes to wind thereon the sprocket chains 28, or whatever type of flexible connection is provided. This causes through the sprocket wheels 27 or other means employed a rocking movement of the saw carrying yoke frame about the axis of the pivot pins 8. The result is that the saw is elevated, the first movement being substantially vertical and the work is engaged on its under face at an intermediate point by the teeth of the saw, so that the saw begins to enter the work while still traveling in a nearly vertical though curved path. As the rocking movement of the yoke-carrying yoke frame continues the saw rises through the work with a rising progressive movement, which, however, in the particular showing of Fig. 1 is away from the operator. But, with the saw rotating in a counter-clockwise direction as viewed in Fig. 1, it forces the work toward the straight edge 4 and if the work be held down by a clamp such as is afforded by the saw guard of the aforesaid application, the work is steadily held while the cut off operation is progressing.

The radius of the arc through which the saw travels in the arrangement of Fig. 1 is less than half the diameter of the saw, while at the same time the saw is acting upon nearly the entire width of the work during its progress therethrough. Because of this the saw is not deflected by hard spots such as are found in heart wood, since as soon as the saw has entered even a short distance into the wood it has an extended engagement therewith. This also obviates any pinching on the saw which sometimes occurs when the saw passes through the wood in the direction of the breadth thereof.

Moreover, the short radius of travel of the saw reduces the length of travel to a minimum.

Furthermore, the sweeping cut not only permits and insures straight and accurate cutting without any liability of the saw dodging if crowded or dull, or in the case where warp and twist in the lumber causes tension conditions which sometimes causes a pinching of the saw, when cutting in a direction from edge to edge, sufficient to stop and heat the saw, but the sweeping cut causes more saw teeth to engage at a time in the cutting off of the board, less coarse saw-dust is taken in proportion to the feed of the saw into or through the board, and faster and smoother cutting results.

Figure 8:
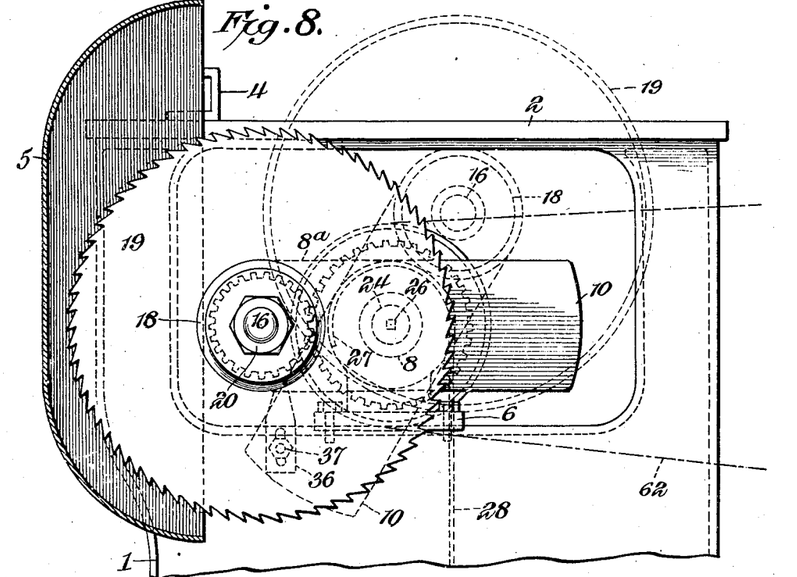
Fig. 8 is an elevation similar to Fig. 1 but drawn on a larger scale and limited to those parts of the machine immediately adjacent to the saw, the saw guard being shown in vertical section.
Figure 9:
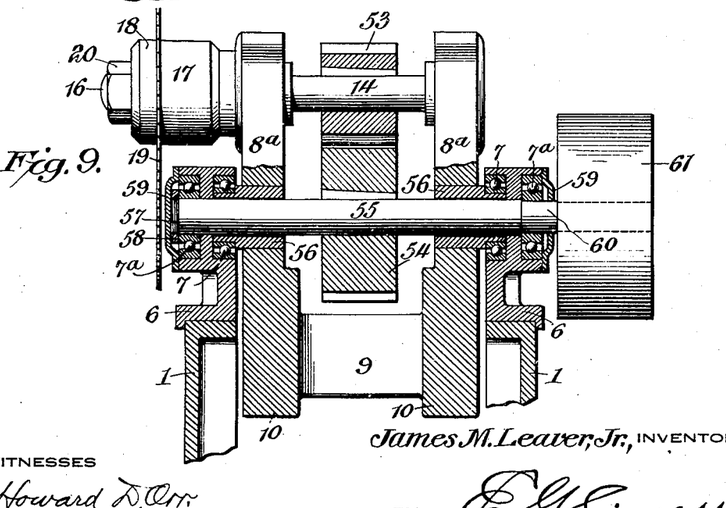
Fig. 9 is an elevation, partly in section, of a portion of the structure of Fig. 8 when in the position indicated in dotted lines, distant parts being omitted.

The structure shown in Figs. 8 and 9 embodies the principles of the structure of Fig. 1 and associated figures in so far as concerns the feed of the saw through a rising arc including a segment of a circle having a radius less than the radius of the saw, so that the feeding travel of the saw rises from a substantially horizontal plane in a curved path toward or even beyond the vertical, and the saw enters the work at the bottom surface thereof and progresses toward both edges of the work at the same time, with the advantageous results already described.

The principal feature of the structure of Figs. 8 and 9 is the simple driving means for the saw. Carried by and fast to the saw arbor 14 is a pinion 53 in mesh with a gear wheel 54 on a drive shaft 55 in the axis of rocking of the saw carrying yoke frame provided with the arms or legs 8ª. The frame 1 is provided with brackets 6 similar to the brackets 6 of Fig. 1, except that each bracket is provided with two sets of antifriction journal bearings 7 and 7ª, respectively. The bearings 7ª each carry a sleeve 56 to which is made fast a respective one of the arms or legs 8ª of the yoke frame carrying the saw. Each sleeve 56 encircles the shaft 55, which latter is supported at the ends in the journal bearings 7ª, and at one end is screw-threaded as indicated at 57 and there has a nut 58 applied to it. The journal bearings 7ª are retained in the brackets 6 by cap plates 59.

That end of the shaft 55 remote from the saw is provided with an axial extension 60 carrying a drive pulley 61 to which may be applied a belt, merely indicated in dotted lines at 62 in Fig. 8. The relation of the pinion 53 and gear 54 and the pulley 61 is such that the saw may be driven at the desired speed. Since the saw carrying rockable yoke frame has its axis of rocking coinciding with the axis of the shaft 55, the gear wheel 54 and pinion 53 always remain in mesh no matter to what extent the yoke frame is rocked. Furthermore, slipping between the drive shaft and the saw is wholly eliminated.

The structure of Figs. 8 and 9 eliminates all driving mechanism in the machine itself, except two gears, a drive shaft and a drive pulley, while the drive shaft is located in the axis of rocking of the saw carrying yoke frame, thus reducing the driving mechanism to a minimum of parts.

Figure 10:
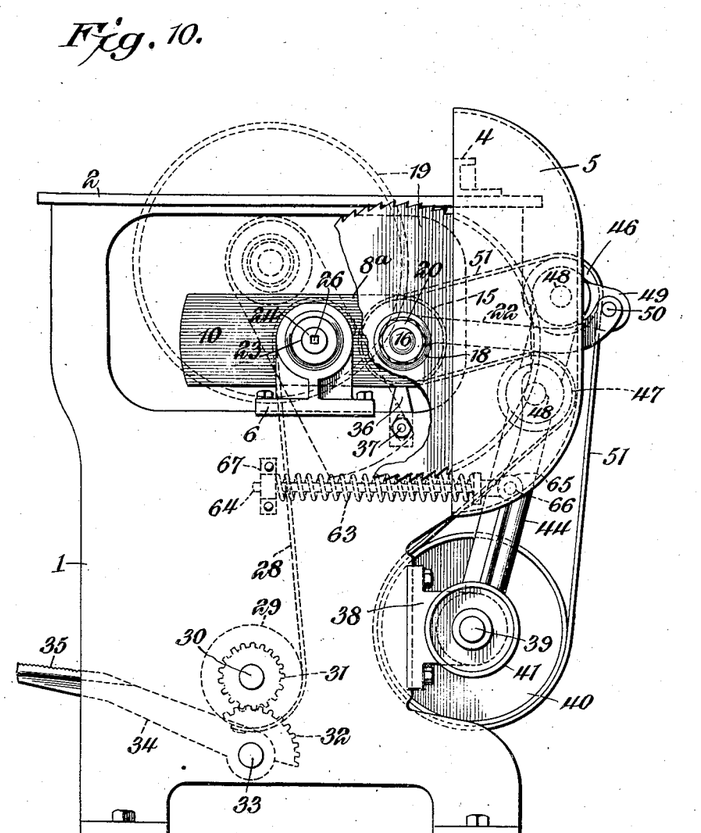
Fig. 10 is an end elevation similar to Fig. 1, but showing another arrangement of the parts.
Figure 11:
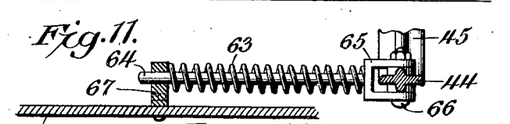
Fig. 11 is a view of the spring shown in Fig. 10, with some immediately adjacent parts shown in section.

In Figs. 1 and 8 the straight edge or abutment for the work is shown as located on the operator's side of the machine. In Fig. 10 there is shown a machine similar in all respects to the showing of Fig. 1, except that the saw, the saw guard, and the work abutment or straight edge are located on the side of the machine remote from the operator, and there is also shown a somewhat different arrangement of spring for returning the swinging frame 44 to its initial position after being displaced therefrom.

Since the structure of Fig. 10 is, so far as the running parts of the machine are concerned, but a reversal of the arrangement of Fig. 1, the same reference numerals are employed where the only difference resides in the reversal of certain parts.

Since in Fig. 10 the frame 44 is swung away from the axis of rocking on the saw carrying yoke frame, instead of toward it in the initial position of the parts, as in Fig. 1, there is provided a compression spring 63 in place of an expansion spring 52 of Fig. 1. The spring 63 is mounted on a slidable rod 64 having a yoke 65 at one end straddling one of the side members of the frame 44 and pivoted thereto by a bolt or pin 66. The other end of the rod 65 moves freely through a bracket 67 on one end member of the frame 1. When the treadle lever 34 is actuated by the foot of the operator, the strand 28 is wound upon the sprocket wheel or drum 29, as before, thus causing the saw carrying saw frame to rock upon its pivot pins, but this time toward instead of away from the operator. This causes the rocking of the frame 44 by the belt drive of the saw in a direction toward the operator, thus compressing the spring 63, and when the parts are released the expansion of the spring 63 thus compressed causes the swinging of the frame 44 away from the operator and the return of the parts to their first position.

The showing of Fig. 10 is indicative of the fact that the saw may be located either on the operator's side of the machine or on the opposite side thereof.

Figure 12:
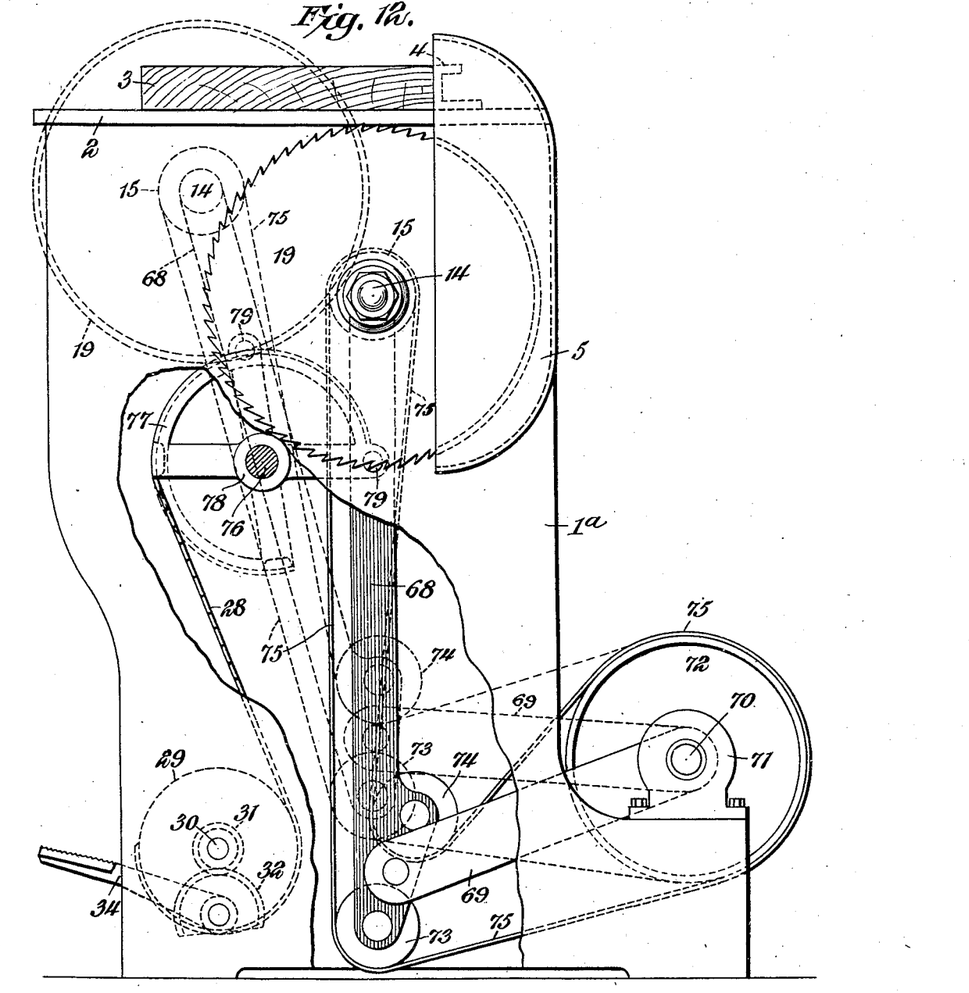
Fig. 12 is an end elevation similar to Figs. 1 and 11, showing another form of the invention, some parts of the structure of Fig. 12 being broken away to show more distant parts, and the scale being larger than that of Figs. 1 and 11.

The machine shown in Fig. 12, while in principle the same as the machine of Fig. 1, differs somewhat in structure and serves to indicate, in connection with Figs. 1 and 8, that the invention is susceptible of various embodiments and demonstrating that the invention may be embodied in other structures than the particular ones illustrated.

In Fig. 12 there is shown a machine frame 1ª differing somewhat in shape from the frame 1 of Fig. 1, because of the somewhat different structure of the machine of Fig. 12.

There is provided a saw 19 and guard 5 as before, and the frame 1 is provided with a work table 2 on which a board 3, representing the work, is shown. A straight edge or abutment 4 is also indicated in Fig. 12.

The saw is mounted upon an arbor 14 carrying a pulley 15, both of which may be substantially similar to the showing of Fig. 1 and associated figures. The arbor 14 is carried on the upper end of an upright frame 68 connected near its lower end to links 69 similar to the spacing bars 22 of Fig. 1 and associated figures. Near the lower end of the frame 1ª there is journaled a shaft 70 in journal supports 71 secured to the frame, and this shaft carries a belt pulley 72 corresponding to the pulley 40 of Fig. 1. The shaft 70 may be assumed to carry another belt pulley for the application of power from a suitable source, but the second belt pulley has been omitted from Fig. 12.

Mounted on the frame 68 near its lower end are spaced idler pulleys 73, 74, respectively, around which is directed a belt 75 similar to the belt 51 of Fig. 1 and associated figures, and this belt is also carried around the pulley 15 of the saw arbor 14, the arrangement being such that on movements of the frame 68 by means to be described, the belt 75 always remains taut. Furthermore, the length of the belt is such as to insure against slippage.

A treadle lever 34 and gear segment 32, pinion 31, shaft 30 and drum or sprocket wheel 29 are provided in the structure of Fig. 12 in correspondence with the arrangement shown in Fig. 1 and associated figures.

Mounted on studs 76 projecting from the sides of the frame 1ª and at points below the arbor 14 are arcs 77 about which extend flexible strands 28 whether in the form of sprocket chains or belts, the action being the same in either case. The arcs, of which only one is shown, are indicated as semicircular, but it will be understood that they may include either more or less than a semicircle, since in their action they have a movement of less than 180°, and seldom exceed more than about 90° in movement, although the range of movement provided may be more than 90°, as indicated in dotted lines in Fig. 12. One arm of the arc 77 connecting it to a hub 78 mounted on the supporting pin 76 carries at its outer end a pin 79 which may be fast to or engage the corresponding side bar of the frame 68.

When the treadle lever 34 is depressed, the strand 28 is wound upon the drum or pinion 29, thus causing a rocking of the arm 76 to a commensurate extent and in a direction to lift the frame 68, so that the pin 79 describes an arc about the axis of the pin or stud 76.

The lower end of the frame 68 because of the presence of the spacing bars or links 69 describes an arc about the axis of the shaft 70, such arc, because of the length of the links 69, being rather shallow. The combined action of the links 69 and the arc 77 upon the frame 68 causes the saw 19 to rise for a distance in a nearly straight line, and then swing away from the abutment 4 in a curved path, but about a radius less than the radius of the saw in the particular arrangement shown in Fig. 12.

The same general entering action of the saw into the bottom surface of the work occurs in Fig. 12 that occurs in the arrangement of Fig. 1, except that the saw enters more deeply into the work, while following an approximately vertical path, than occurs in the arrangement of Fig. 1.

It has heretofore been the custom in rotary cut off saw machines to cause the saw to move into one edge of a board, if such particular material be the work operated upon, toward the other edge of the board, with the saw arbor moving in an arc of long radius, so that the progress of the saw through the work is very close to a straight line extending crosswise, or in the direction of the width of the work.

This invention distinguishes from such structures in that the saw enters the work from one face and passes through the work toward the other face, in a path which, though curved, closely approaches a straight path while passing through the work, thereby greatly reducing the extent of travel of the saw.

The saw mounting of this invention provides a disappearing saw having a travel about a short radius producing a sweeping cut through the board extending practically from edge to edge in narrower boards and only approaching a widthwise direction of travel near the edge from which the saw leaves the board in wide boards.

The radius of the arc of travel of the saw need only be about one-third of the diameter of the saw. For instance, with a sixteen inch saw, boards up to fourteen inches in width and one, two or more inches in thickness may be readily cut by a sweeping cut when the radius of travel of the saw is about five inches. To graphically illustrate the action of the saw reference is had to the diagram of Fig. 13, where the table 2, straight edge 4, work 3, saw 19 and the portion of the yoke frame between the arbor 14 of the saw and pivot 8 of the yoke frame and indicated at 8ª are diagrammatically illlustrated.

Figures 2, 13:
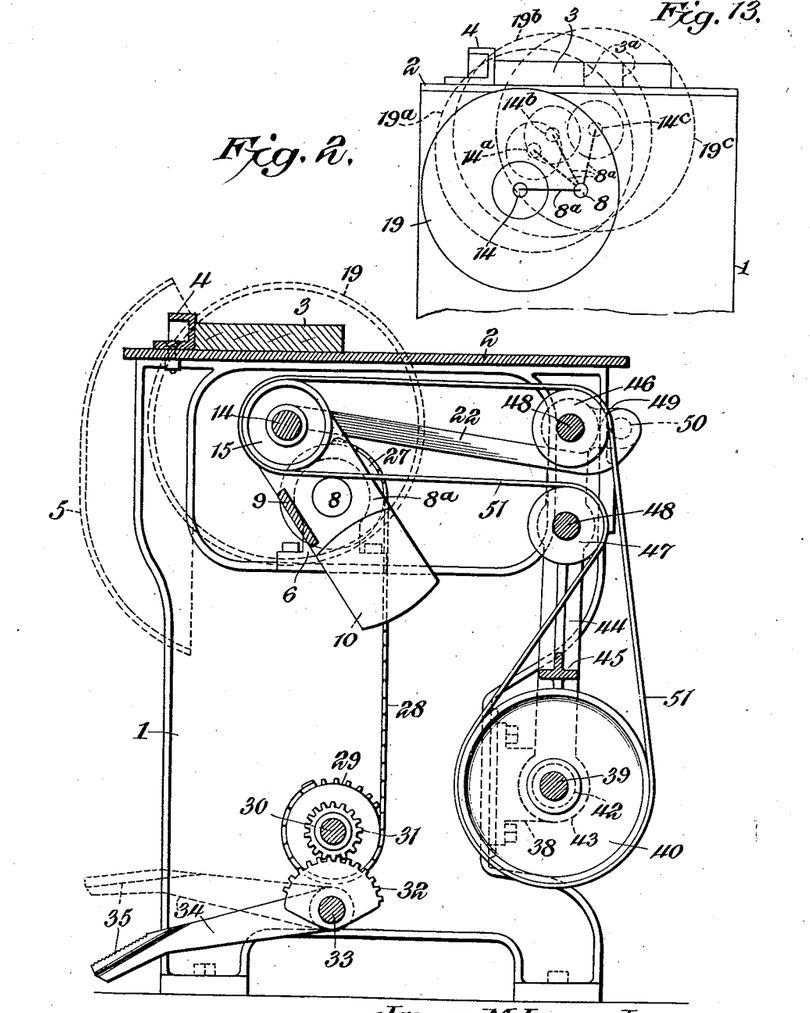
Fig. 2 is a front to rear upright section taken between the saw and its drive pulley, as shown in the machine of Fig. 1, the saw and saw guard, which are removed in Fig. 2, being indicated in dotted lines.
Fig. 13 is a diagram representing the action of the saw.
Figure 3:
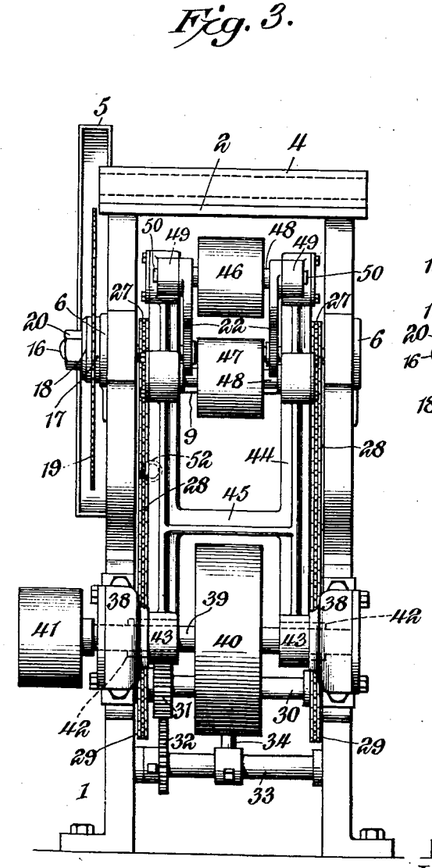
Fig. 3 is a rear elevation of the machine of Fig. 1; that is, the elevation is the one seen from that portion of the machine opposite from the operator's side.
Figure 4:
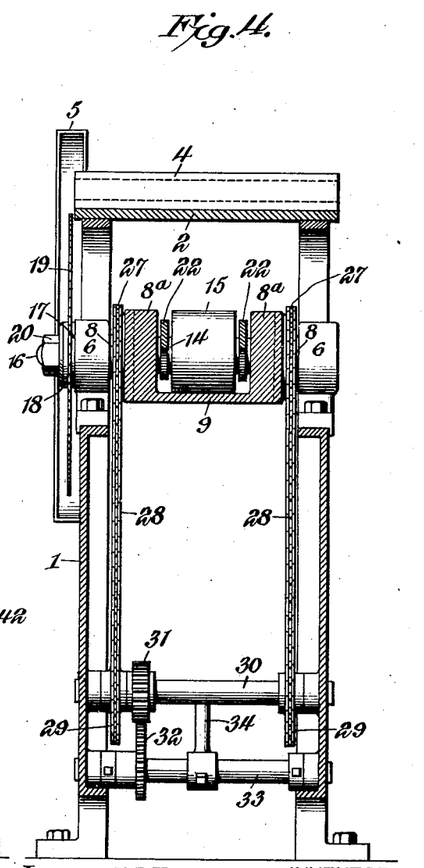
Fig. 4 is a section on the line 4—4 of Fig. 1.
Figures 5, 6, 7:
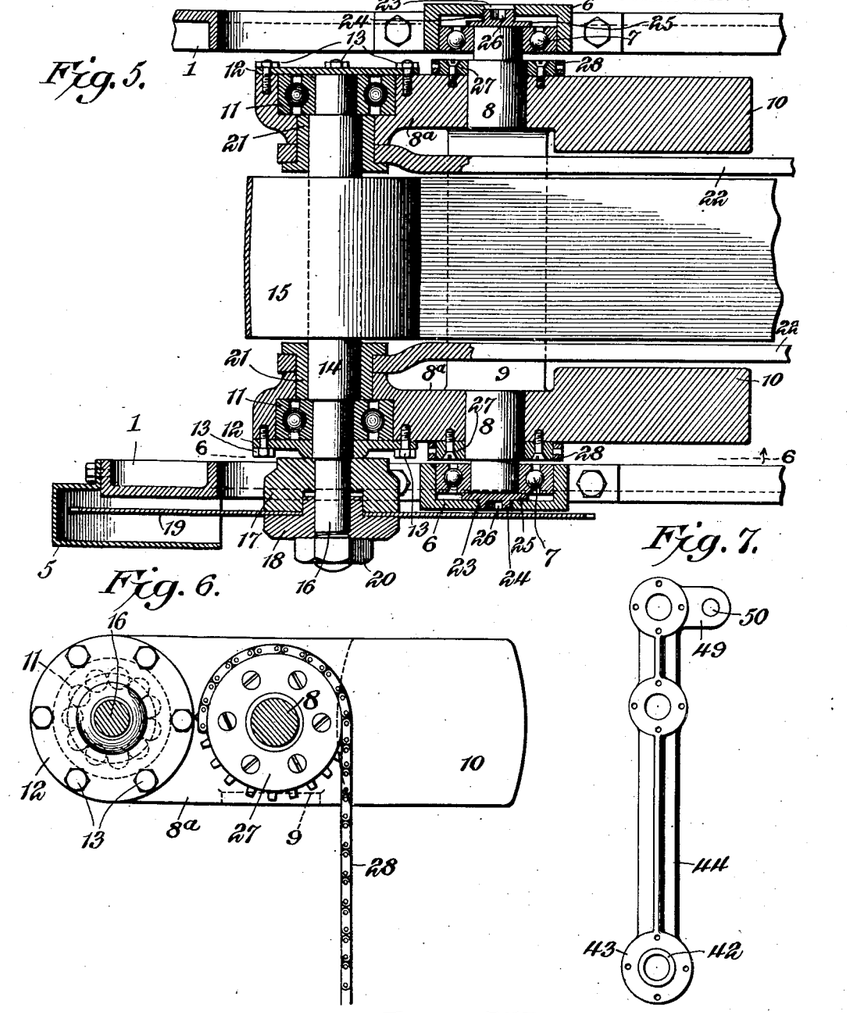
Fig. 5 is a section on the line 5—5 of Fig. 1, drawn on a larger scale and restricted to the saw portion of the machine, the swinging belt directing frame being omitted.
Fig. 6 is a section on the line 6—6 of Fig. 5.
Fig. 7 is a detail view showing one of the arms of the swinging belt directing frame.

The normal or inactive position of the saw is indicated in Fig. 13 in solid lines, with the then upper edge of the saw as close as practicable to the under surface of the work 3, which may be considered as a board two inches thick and fourteen inches wide in the full line illustration, or seven inches wide, or ten inches wide as indicated by the respective dotted lines 3ª.

When the saw is raised about the pivotal axis 8, it enters the bottom of the board 3 near the straight edge 4, entering the board between the two edges thereof and rising into the board from the bottom face toward the top face.

When the saw has raised sufficiently to completely sever the board 3 if it be considered as seven inches wide and two inches thick, the saw will have moved from the solid line position to the dotted line position 19ª and the arbor 14 will have moved from the full line position to the dotted line position 14ª. Considering the radius of movement 8ª to be five inches, the rise of the arbor 14 will represent a movement about the pivot 8 of about three inches. The board having been severed the foot pedal may be released and the saw allowed to drop to its first position. If the board be ten inches wide, then by the time the saw has reached the dotted line position 19ᵇ the board of ten inch width will have been severed and the arbor 14 will have moved to the position 14ᵇ through a path of about eight inches in extent, the saw in both instances traveling upwardly from the bottom surface of the board to the top surface thereof, with the teeth of the saw engaging the board from edge to edge until the saw finally merges through the top edge of the board. There has been in each case a progressive movement of the saw away from the position of the straight edge 4, but this has not been sufficient to bring about any edge to edge progressive cutting through the board.

If the board be fourteen inches wide and two inches thick, then the saw is moved from the solid line position to the dotted line position 19ᶜ and the arbor 14 is moved from the full line position to the dotted line position 14ᶜ. This means a short widthwise movement of the saw through the board, but throughout by far the greater portion of the board the saw bodily rises from the under surface of the board to and through the top surface of the board with the kerf progressing toward both edges of the board. In so wide a board as one of fourteen inches with the short radius of movement of five inches, there is a travel of eight inches of the saw arbor from the position of rest to the point where the two inch by fourteen inch board is completely severed. With a one inch board the movements are less for the different widths than those mentioned.

With disappearing saws as heretofore proposed the radius of the arc of travel is very much longer than with the saw of this invention. With a rotary circular saw of sixteen inches diameter the arc of travel of the structures heretofore proposed ranges from twelve to seventeen inches for a board fourteen inches wide, and then the saw rises above the top of the table at a considerable distance in advance of the edge of the work remote from the straight edge.

Figures 14, 15:
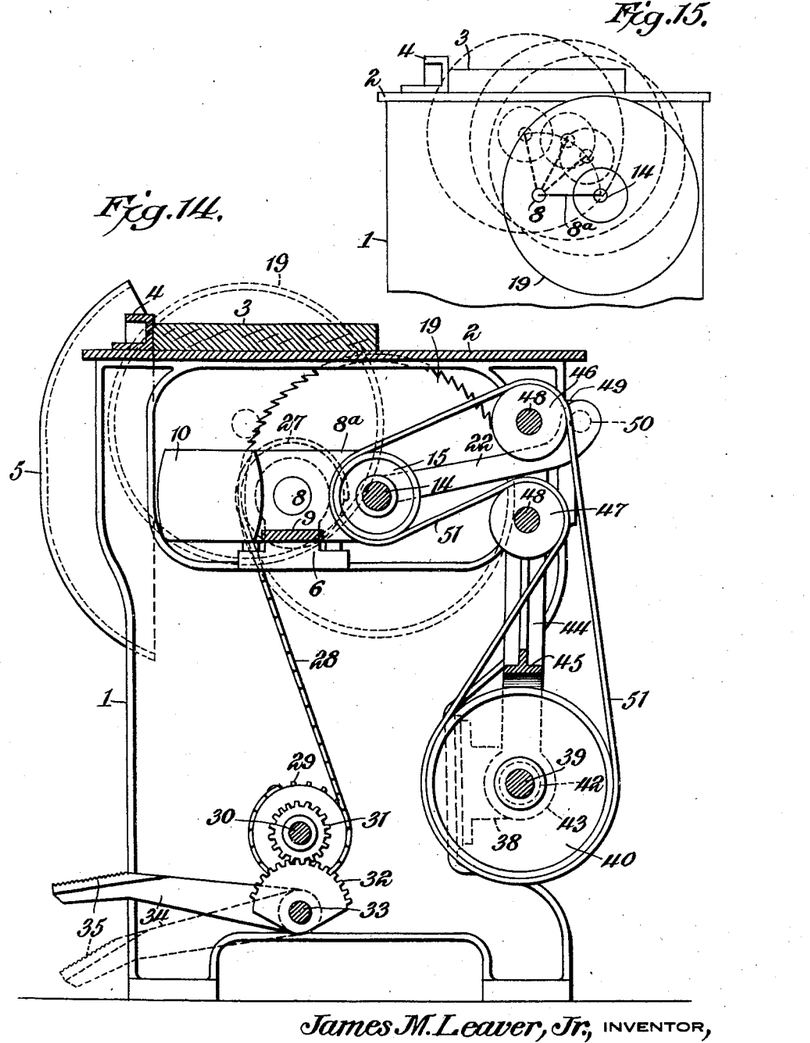
Fig. 14 is an elevation like that of Fig. 1, but showing the saw mounted for being fed in the opposite direction.
Fig. 15 is a diagram like that of Fig. 13, but showing the action of the saw of Fig. 14.

With the machine of this invention the travel of the saw may be either toward or away from the abutment as it rises through the work. Proper positioning of the abutment with the saw cutting theretoward will give results like those obtained with the saw cutting away from the abutment. In Figs. 14 and 15 the feeding movement of the saw is toward the abutment and as the mechanical parts are the same as in Figs. 1 and 13 except as to the relative locations of the saw and carrying parts and the direction of feed of the saw, the same reference numerals are used and the description of the structure of Fig. 1 and diagram of Fig. 13 may be read upon Fig. 14 and the diagram of Fig. 15.

The short radius of movement whereby the rising action of the saw with respect to the work is obtained makes it possible to locate the saw so close to the top of the table that the cutting edge is covered by the work and is but a very small fractional part of an inch removed from that face of the work into which the saw first enters.

What is claimed is:—

1. A rotary cut-off saw machine having work-locating means and provided with a rotary saw and a mounting therefor, both having a position of rest below the plane of the work locating means, with the saw having a range of cutting movement imparted thereto by said mounting through an initially rising arc and subsequently through a falling arc, and said saw being located with reference to the work-locating means on the machine so as to enter the lower surface of the work intermediate of the width thereof and rise bodily into the work to and through the upper surface thereof and then progress crosswise of the work.

2. A rotary cut-off saw machine having work-locating means and provided with a rotary saw and a mounting therefor, both located below the plane of the work-locating means with the saw immediately below the work, said mounting having a direction and range of movement to cause the saw to rise into work-engaging position and enter the work intermediate of the width and nearer to one edge thereof than to the other edge and move upwardly through and at the same time progressively across the work, and finally lowering toward the termination of the range of movement.

3. A rotary cut-off saw machine provided with a rotary saw and a mounting in which the arbor of the saw is journaled, said mounting having a pivotal axis parallel with the saw axis and spaced therefrom by a distance less than the radius of the saw, said machine having a table for work located with reference to the saw arbor and mounting therefor to permit an active rising and forward progressive movement of the saw to engage the under surface of the work intermediate of its width near one edge and rise bodily into and through the work and at the same time progress toward the other edge thereof, the completion of the full bodily travel of the saw being in a downward arc.

4. A rotary cut-off saw machine having a table and a pivotally mounted rotary saw movable through the table and the work, when cutting, in a rising arc of a radius less than that of the saw.

5. A rotary cut-off saw machine, comprising a saw table, a rotary saw normally below the upper surface of the table, and a rockable support for the saw below the saw table and having its axis of rocking substantially on a level with the axis of rotation of the saw in the inactive or initial position of the rockable support, the radius of movement of the support about its pivotal axis being less than the radius of the saw and the rockable support having a range of movement to carry the axis of the saw over and beyond the axis of rocking.

6. A rotary cut off saw machine provided with a saw table, a rotary saw normally located below the top surface of the table, and rockable means for moving the saw while rotating upwardly above the table through work located thereon, said rockable means having means for supporting the saw in spaced relation to the axis of rocking with the radius of movement of the saw about the axis of rocking less than the radius of the saw.

7. A rotary cut off saw machine provided with a rotary saw, a saw table, a straight edge or abutment for positioning the work on the table, and rockable supporting means for the saw locating the latter in its initial position immediately below the level of the upper surface of the table and adjacent to the work, said saw supporting means having a range of rocking movement through an arc of a radius less than that of the saw to lift the latter into engagement with the lower face of the work on the table and move the saw through the work toward the upper face thereof and also crosswise of the work toward one edge thereof.

8. A rotary cut off saw machine having a saw table, a rockable member located below the top of the table, a saw arbor mounted on the rockable member to one side of the axis of rocking and spaced therefrom by a distance less than the axis of rocking, a rotary saw on the saw arbor, and means for rocking the saw carrying member to raise the saw while rotating above and move it crosswise of the table.

9. A rotary cut-off saw machine provided with a saw table, a rockable member located below the top of the table, a saw arbor mounted on said member to one side of its axis of rocking and spaced therefrom by a distance no greater than the radius of the saw, counterbalancing means on the other side of the axis of rocking, a saw mounted on the saw arbor, and means for moving the rockable member to lift the saw above the saw table through a rising and then a falling arc of travel, the rockable member being located to cause the axes of rocking and of the saw arbor to be on substantially the same level, with the edge of the saw approximately at the table level in the initial or inactive position of the saw, and to further cause the axis of the saw arbor to move over and beyond the axis of rocking before the completion of the full range of travel of the saw arbor.

10. A rotary cut-off saw machine provided with a saw table, a rockable member located below the table, a saw arbor mounted on the rockable member and spaced from the axis of rocking by a distance no greater than the radius of the saw, means for rocking the rockable member, and a stop for the rockable member for limiting the travel of that end of the rockable member carrying the saw arbor to a position where the axis of rocking and the axis of the saw arbor are in a substantially level plane, with the saw edge approximately at the table level, the range of movement of the rockable member away from the stop being sufficient to carry the saw arbor over and beyond the axis of rocking of the rockable member.

11. A rotary cut-off saw machine provided with a saw table, a rockable carrier for a rotary saw located below the table with the axis of rotation of the saw spaced from the axis of rocking of the carrier, means for rocking the carrier to move the saw through a rising arc toward and through work on the table, and belt-drive means for the saw comprising a drive pulley mounted for rotation on the machine, a substantially upright swinging frame pivoted at one end in the axis of the drive pulley and at the other end provided with idler pulleys for different runs of the belt between the drive pulley and the saw, and connections between the rockable carrier and the swinging frame at the idler pulley end thereof in rear of the idler pulleys for maintaining a constant relation therebetween to keep the belt taut in different positions of the rockable carrier.

12. A rotary cut off saw machine comprising a saw table, a rockable frame mounted in the machine below the saw table and provided with a saw arbor on one side of its axis of rocking, a pulley on the saw arbor, means for rocking the frame from an initial position where the axis of rocking of the frame and the axis of the saw arbor are both in a substantially horizontal plane to move the saw arbor through a rising arc, a drive pulley mounted in a substantially fixed position at a low point on the machine, an upright swinging frame between the drive pulley and the pulley of the saw arbor and provided with idler pulleys, a belt extending about the drive pulley, idler pulleys and saw arbor pulley, and connections between the rockable frame at the idler pulley end thereof and the swinging frame to maintain the relative positions of the two frames for maintaining the belt taut at all times, said connections consisting of a pair of bars each pivotally connected at one end to said swinging frame in rear of said idler pulleys and at the other end pivotally mounted on the axis of the saw arbor.

In testimony, that I claim the foregoing as my own, I have hereto affixed my signature in the presence of two witnesses.

JAMES MARSHALL LEAVER, Jr.

Witnesses:
P. MARRON,
JOSEF KEISER.